Figure 1:
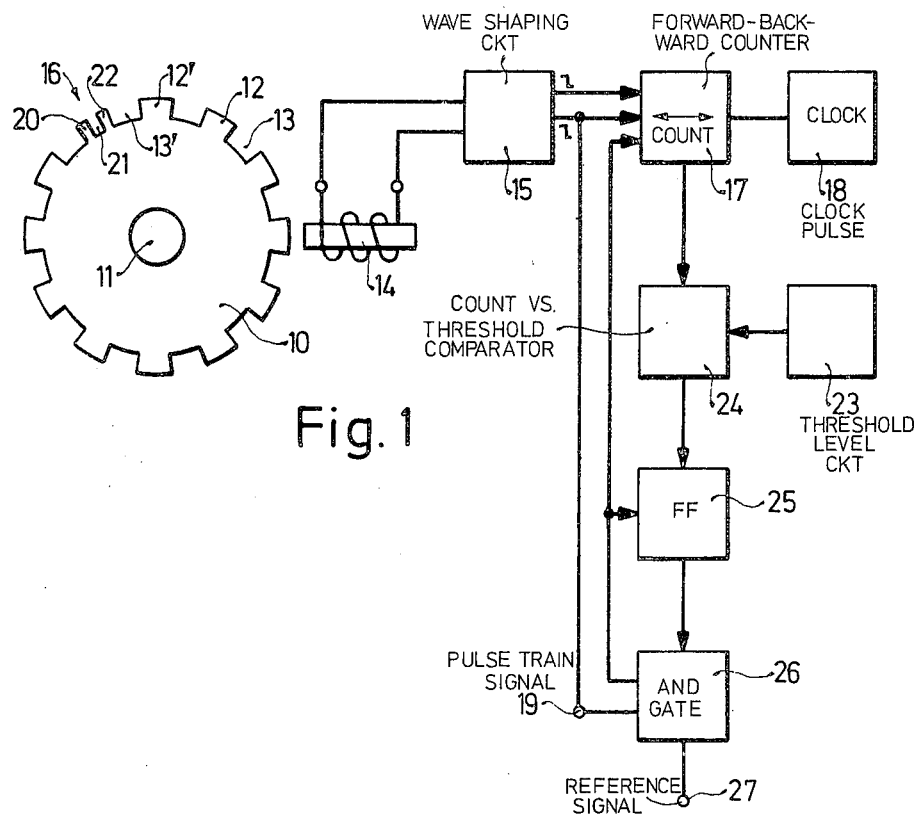

United States Patent [19]
Ackermann et al.

[11] 3,930,201
[45] Dec. 30, 1975

[54] PULSE SOURCE TO PROVIDE A PULSE TRAIN REPRESENTATIVE OF MOVEMENT OF A SHAFT AND A REFERENCE PULSE REPRESENTATIVE OF A REFERENCE POSITION

[75] Inventors: Fritz Ackermann, Stuttgart; Günter Hönig, Markgroningen; Alfred Schulz, Braunschweig, all of Germany

[73] Assignee: Robert Bosch G.m.b.H., Gerlingen-Schillerhohe, Germany

[22] Filed: Sept. 27, 1974

[21] Appl. No.: 509,846

[30] Foreign Application Priority Data
Nov. 15, 1973  Germany............................ 2357061

[52] U.S. Cl................... 328/1; 310/168; 324/34 PS; 324/34 GT; 328/63; 340/271
[51] Int. Cl.²...................... G01P 3/44; H02K 24/00
[58] Field of Search..................... 340/271; 310/168; 235/92 MP, 92 V; 250/231 SE; 328/1, 2, 63; 331/65; 324/34 GT, 34 PS, 34 D

[56]  References Cited
UNITED STATES PATENTS
2,656,106   10/1953   Stabler............................. 340/271 X
3,696,303   10/1972   Hartig.................................. 328/55

*Primary Examiner*—Siegfried H. Grimm
*Attorney, Agent, or Firm*—Flynn and Frishauf

[57]  ABSTRACT

Transducer elements, such as the teeth of a star-wheel are uniformly distributed around the circumference of a disk; one of the teeth is slit to form a double tooth with a gap therebetween, the two-part teeth and the gap, each, taking one third of the space of a tooth; and a circuit, such as a counter counting at a rate much faster than the pulse repetition rate of the pulse source counts forwardly when sensing a tooth, and backwardly when sensing a gap, so that the count state of the counter, after a tooth-gap count will be zero, except when counting backward after the second part-tooth throughout the length of the normal-size gap, the non-zero count state of the counter being sensed by a threshold detector and providing a signal upon presence of the next tooth, so that a reference signal, at a predetermined tooth position, will be provided as well as the pulses representative of the passage of each one of the teeth.

10 Claims, 2 Drawing Figures

U.S. Patent  Dec. 30, 1975  3,930,201

PULSE SOURCE TO PROVIDE A PULSE TRAIN REPRESENTATIVE OF MOVEMENT OF A SHAFT AND A REFERENCE PULSE REPRESENTATIVE OF A REFERENCE POSITION

The present invention relates to a pulse transducer system and more particularly to a pulse source for attachment to a shaft in which a pulse train is derived, as the shaft rotates and, additionally, a single reference signal is provided representative of a particular angular position of the shaft.

Pulse sources which provide pulses as a shaft rotates are used, for example, in automotive vehicles. The pulse sources may be so arranged that they provide signals representative of rotation of the shaft, thereby providing signals at predetermined angular positions of the shaft, for example the crankshaft of the engine. These signals are uniformly distributed in time as the crankshaft rotates. Increasing the number of teeth on a disk, for example a star-wheel, permits increasing the accuracy with which the particular angular position of the crankshaft can be determined at any instant of time. The teeth, for example magnetized, induce pulses in a pick-up coil located in inductive relation to the teeth of the star-wheel. Such pulse sources are also used to determine the speed of the crankshaft. It is also frequently necessary to obtain a predetermined reference signal, for example a signal which indicates the upper dead-center position of a piston connected to the crankshaft which may be termed the "zero" position of the crankshaft, for example. Signals which characterize this one particular reference position should also be obtained by the pulse source, since such signals can be used to initiate, for example, ignition. Of course, the particular reference signal may occur at any one predetermined angular position of the crankshaft, for example 60° offset with respect to the upper dead-center position of the piston. To generate such a reference signal, it has previously been customary to add a second disk, with a single tooth, adjacent a star-disk having many teeth, and providing an inductive pick-up in inductive relation to the single tooth. The reference signal is induced when the single tooth passes the pick-up.

The two disks must be accurately located with respect to each other in order to accurately relate the reference pulse to the pulses derived from the star-wheel. Manufacturing such arrangements, with two star-wheels and, usually, with two pick-ups, increases the manufacturing cost of the entire arrangement. The adjustment of the relative location of the two disks with respect to each other introduces an additional and expensive cost factor, since the relative placement of the disks usually must be carefully fitted by hand.

It is an object of the present invention to provide a pulse source, typically a pulse train generator, which generates signals uniformly spaced from each other as a movable element, for example a shaft, moves in the course of an operating cycle and in which, further, a reference signal is generated which characterizes a particular location of the movable element, for example the "zero" or reference position of the shaft. The pulse generator should be simple and sturdy in construction, reliable, and should be particularly suitable for use in automotive applications.

SUBJECT MATTER OF THE PRESENT INVENTION

Briefly, a plurality of transducer elements are provided, shaped to generate in a transducer receiver, or pick-up, a sequence of pulses which have a 1:1 sensing relationship of transducer elements and resulting pulses; one of the transducer elements is shaped differently from the others and is located in advance of that transducer element which is to provide the reference pulse.

Typically, if a star-wheel is used having projecting teeth of generally square, or trapezoidal shape, one tooth which is differently shaped is cut to provide two tooth portions with a gap therebetween; preferably, the portions and the gap, each, are spaced over ⅓ width of a tooth. A circuit, for example a forward-backward counting counter is then provided which counts forwardly when pulses are generated and backwardly during pulse gaps. When the normal tooth sequence passes, the forward and backward counts of the counter will cancel; when the divided tooth, however, passes, the backward count of the counter after the second tooth will be longer than the forward count (since the tooth was only ⅓ the width of the other teeth, but the subsequent gap is still of normal size), resulting in a count state of the counter when the next tooth appears which is other than zero. This count state is detected and the reference pulse is obtained thereby.

Figure 2:
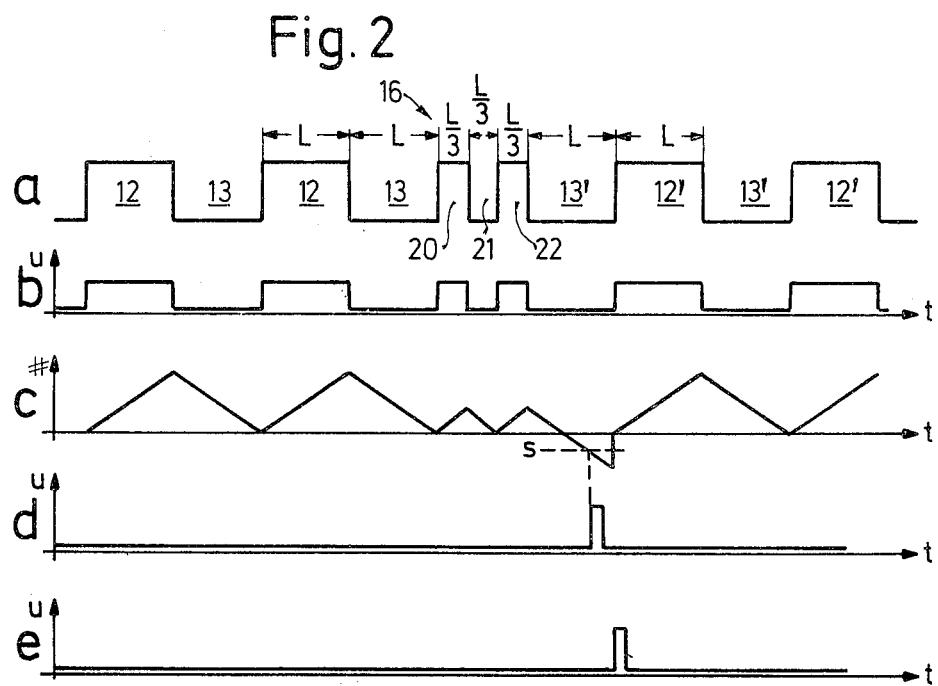

The invention will be described by way of example with reference to the accompanying drawings, wherein:

FIG. 1 is a schematic representation of the pulse source, and a schematic block circuit diagram of the circuit connected thereto which provides the reference pulse; and FIG. 2, in graph lines $a$ to $e$, is a diagram showing relationships and signals in the circuit of FIG. 1.

A star-wheel, or disk 10 (FIG. 1) is secured to a shaft 11 which, for example, may be the crankshaft of an automotive engine, or a shaft rotating in synchronism therewith. The star-wheel 10 is formed with projecting teeth 12, spaced from each other by gaps 13. The width of the teeth 12 is equal to the width of the gaps 13. The teeth 12 pass by a fixed pick-up coil 14. The coil 14 will have voltages induced therein as the teeth pass therealong, to provide output signals from coil 14 which are connected to a wave-shaping circuit 15. The wave-shaping circuit 15 transforms the signals derived from coil 14 into square wave pulses. The sensing ratio of the square wave pulse train with respect to the teeth 12 and gaps 13 of the star-wheel 10 is 1:1. The leading edge of any pulse can then, for example, determine the angular position of the shaft 11.

One of the teeth, tooth 16, is cut into two tooth portions 20, 22, separated by a gap 21, in order to obtain a reference signal for the zero, or reference position of the shaft 11.

FIG. 2, graph $a$, shows a developed view of the circumference of the star-wheel 10. The length of the teeth and of the gaps, respectively, is shown at L. As seen, the length of the teeth 20, 22 is L/3, and the length of the gap 21 therebetween likewise is L/3. The length of the gap 13' following the tooth 22 is again L. The pulses derived from the wave-shaping circuit 15, triggered by the signals induced in pick-up coil 14 are illustrated in graph $b$ of FIG. 2. A clock pulse source 18, having a pulse repetition rate which is high with respect to the repetition rate of circuit 15 (FIG. 2, graph b) is connected to a forward-backward counter 17. Counter 17 counts the clock pulses derived from source 18 when the output voltage from circuit 15 is high, and counts backwards when the output voltage is low. When the counter 17 senses the positive flank of an output signal from circuit 15, the counter is set to zero and then starts to count forwardly at the rate of the clock pulses from clock pulse source 18. As the negative flank of the signal from circuit 15 is sensed, the count direction of the counter 17 reverses and the pulses from pulse generator 18 are now counted backwardly. After the pulse gap has terminated, the counter will be again at zero. The positive flank of the output signal from the wave-shaping circuit 15 provides a signal representative of a predetermined angular position of shaft 11. This signal can be derived from terminal 19. The counting state of the counter is indicated in graph c of FIG. 2. As this graph clearly shows, the count state reaches a maximum at the end of each pulse from circuit 15 and then drops again to zero during the subsequent pulse gap. By suitable selection of the pulse repetition rate of generator 18, the state of the counter will always be zero, or approximately zero, even if the shaft 11 should accelerate, or decelerate during passage of a tooth-gap combination.

When the first tooth portion 20 of the tooth 16 passes the coil 14, counter 17 will again count forwardly. When the gap 21 is sensed, the count direction will again reverse to zero. Since the tooth portion 20 and the subsequent gap 21 are of the same width, counter 17 will naturally revert to zero, or approximately zero state. When the next tooth portion 22 passes the coil 14, the count will again be in forward direction. The count state, of course, will be less than that which the counter will reach when counting one of the teeth 12, since the time during which the wave-shaping circuit 20 provides a signal that a tooth is present is much less (⅓ of that when a tooth 12 is present). The subsequent pulse gap 13' is of normal length, however, and the counting, in negative direction, will result in a negative count state which is clearly and unambiguously different from zero or null. When the count state reaches a certain negative threshold value s (see FIG. 2, graph c), as determined by a threshold circuit 23, or by a count state sensing circuit or tap, a comparator or similar sensing circuit 24 provides a signal indicative that the counter 17 has reached, or passed the negative level s. This signal is connected, as a recognition or trigger signal to a subsequent bistable flip-flop 25. The recognition pulse, indicated in graph d of FIG. 2 changes flip-flop 25 into its second switching state to provide a signal to a gate circuit 26. Gate 26 is a conjunctive gate, that is, has the function of an AND-gate. At the next pulse, triggered by tooth 12', the second input of gate 26 will likewise have a signal applied thereto, causing the gate circuit to become conductive and providing a reference signal at its output terminal 27 (see FIG. 2, graph e). This reference signal characterizes the zero, or reference position of the shaft 11. Such reference signals may, of course, be generated at any desired other position of the shaft 11.

As soon as the reference signal is sensed, a second output from the AND-gate 27 is fed back to the flip-flop 25, as well as to the counter 17 to reset both the flip-flop 25 and counter 17. The cycle may then repeat.

The present invention has been described in connection with an inductive transducer. Different transducer systems may be used, such as optical transducers, carrier frequency transducers, capacitative transducers, and other elements which are preferably non-contacting and provide a pulse train of signals, and signal gaps, directly or after being connected through a suitable wave-shaping circuit so that the output signal will be essentially similar to that shown in FIG. 2, graph b. The wave-shaping circuit may, for example, be a bistable flip-flop, triggered into conduction in one state upon sensing of the leading edge of a tooth and reverting to the other state upon sensing of the trailing edge of a tooth of the star-wheel 10.

Various changes and modifications may be made within the scope of the inventive concept.

Recognition of the reference pulse, as described, is carried out by using a forward-backward counter and a clock pulse, that is, the circuit as described operates digitally. This has a number of advantages, particularly in automotive applications, in which the operating voltage for the various elements may fluctuate within wide limits. The present invention may, however, also be instrumented by providing a rising wave, for example of a shape similar to the curve c of FIG. 2 when a tooth is present under the pick-up, and a dropping wave during a gap 13 between teeth. If the voltage does not balance to zero, but drops to a negative value below a certain threshold s, a signal is triggered. Drop of the voltage below a certain value may be sensed, for example, by a diode, or the base-emitter (or base-collector) junction of a transistor which is suitably poled and is rendered conductive only if a threshold level s at a certain polarity is sensed as the output signal from the transducer system.

We claim:

1. A pulse source to provide a pulse signal train representative of movement of a movable element (11) and a reference pulse signal when the movable element is in a predetermined reference position, having a transducer system including a plurality of transducer elements (12, 13, 16) located on the movable element (11) and a transducer receiver (14) located in energy transfer coupling with respect to said plurality of elements, and providing said signals upon passage of the transducer elements past the receiver, wherein the transducer elements comprise projecting teeth (12) separated by gaps (13) to provide a sequence of pulses in the transducer receiver (14) having a 1:1 sensing relationship of elements and resulting pulses;

and wherein one of the transducer elements (16) is shaped differently from the others (12) and comprises a group of tooth portions (20, 22) separated by gaps (21), located within the space of any other tooth (12) and in advance of that transducer element (12') which provides the reference pulse.

2. Pulse source according to claim 1, wherein the differently shaped transducer element (16) comprises two tooth portions (20, 22) and one intervening gap (21), the tooth portions and gap, each, having ⅓ the width of any other tooth (12).

3. Pulse source according to claim 1, further comprising a counter (17) and a clock source (18) having a clock rate which is high with respect to the pulse repetition of the pulse signals, the counter being connected to count forwardly during occurrence of the pulses and to count backwardly during pulse gaps, to result in a count state of zero, or approximately zero when the sensing relationship is 1:1, but to result in a count state substantially differing from zero after the differently shaped transducer element was sensed.

4. Pulse source according to claim 3, further comprising a conjunctive gate (AND-26) connected to the counter (17) and the transducer receiver (14) and providing said reference pulse upon conjunction of: (a) counter state substantially different from zero; and (b) the next transducer element (12') being sensed by the transducer receiver (14).

5. Pulse source according to claim 4, further comprising a comparator circuit (24) and a threshold circuit (23) connected thereto and storing a predetermined count state representative of deviation of count state from zero in backward direction of the counter and indicative of count of the counter after the last transducer element (22) of different shape has been sensed, the comparator circuit (24) being connected to the counter output and providing an output therefrom to said conjunctive gate (26) when the stored count threshold is exceeded.

6. Pulse source according to claim 5, further comprising a bistable circuit (25) connected between the comparator circuit (24) and the conjunctive gate (26) and changing state when an output is received from the comparator circuit;

and circuit means resetting the bistable circuit and the counter.

7. Pulse source according to claim 3, further comprising a wave-shaping circuit (15) connected between the transducer receiver (14) and the counter (17).

8. Pulse source according to claim 1, wherein the movable element is a shaft (11) and the predetermined reference position is a predetermined angular position of the shaft;

and the transducer elements comprise a disk (10) formed with the teeth and gaps at the circumference thereof in non-contacting energy coupled relation to the transducer receiver (14) which, except for said transducer element (16) of different shape, regularly alternate between two characteristics to provide a pulse sequence of regularly recurring pulses spaced by regularly recurring pulse gaps upon rotation of said shaft, and a different pulse sequence and gap length only when the transducer element of different shape (16) passes a transducer receiver.

9. Pulse source according to claim 8, wherein the differently shaped transducer element (16) comprises two tooth portions (20), 22) and an intervening gap (21), said tooth portions and gap each being ⅓ the width of any other tooth (12);

and circuit means are provided generating a forward signal upon sensing one characteristic of the transducer element and a reverse signal upon sensing of the other characteristic thereof, so that the signals will cancel when the two characteristics substantially balance but will result in a net signal upon unbalance;

and means sensing said unbalance.

10. Pulse source according to claim 1, wherein the movable element is a shaft (11), the plurality of transducer elements comprises a star-wheel (10) having the alternating projecting teeth (12, 16) and gaps (13) therebetween;

and the transducer receiver senses the presence of teeth, and gaps, respectively.

\* \* \* \* \*